(12) United States Patent
Huang

(10) Patent No.: US 10,043,406 B1
(45) Date of Patent: Aug. 7, 2018

(54) AUGMENTED EMOTION DISPLAY FOR AUSTISTIC PERSONS

(71) Applicant: Intel Corporation, Santa Clara, CA (US)

(72) Inventor: Jinshi Huang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/455,333

(22) Filed: Mar. 10, 2017

(51) Int. Cl.
*H04N 5/445* (2011.01)
*G09B 5/02* (2006.01)
*G06K 9/00* (2006.01)
*H04N 5/272* (2006.01)
*H04N 21/44* (2011.01)
*H04N 21/41* (2011.01)
*H04N 21/431* (2011.01)
*H04N 21/81* (2011.01)
(Continued)

(52) U.S. Cl.
CPC ........... *G09B 5/02* (2013.01); *G06K 9/00281* (2013.01); *G06K 9/00302* (2013.01); *G09B 19/00* (2013.01); *H04N 5/272* (2013.01); *H04N 21/4122* (2013.01); *H04N 21/4316* (2013.01); *H04N 21/44008* (2013.01); *H04N 21/8153* (2013.01); *H04N 21/8547* (2013.01)

(58) Field of Classification Search
CPC ............... H04N 5/272; H04N 21/4122; H04N 21/4316; H04N 21/44008; H04N 21/8153; H04N 21/8547; G09B 19/00; G09B 5/02; G06K 9/00281; G06K 9/00302

USPC ......................................................... 348/564
See application file for complete search history.

(56) References Cited

U.S. PATENT DOCUMENTS

2007/0288898 A1* 12/2007 Isberg ................ G06K 9/00335
717/124
2008/0158334 A1* 7/2008 Reponen .................. G10L 15/26
348/14.02
(Continued)

FOREIGN PATENT DOCUMENTS

CA 2905427 A1 10/2014
CN 104820495 A 8/2015
(Continued)

OTHER PUBLICATIONS

Heni, Nazih, et al., "Design of Emotional Educational System Mobile Games for Autistic Children". 2nd International Conference on Advanced Technologies for Signal and Image Processing—ATSIP'2016 Monastir, Tunisia, (Mar. 2016), 7 pgs.
(Continued)

Primary Examiner — Michael Lee
(74) Attorney, Agent, or Firm — Schwegman Lundberg & Woessner, P.A.

(57) ABSTRACT

Various systems and methods for implementing augmented emotion displays are provided herein. A system for displaying emotion embellishments includes a first display device, a processor subsystem, and memory including instructions, which when executed by the processor subsystem cause the processor subsystem to: receive an indication of an emotion being exhibited by a person in a video, the video presented on a first display device; determine an embellishment corresponding to the emotion; and present the embellishment in a location corresponding to the person in the video.

24 Claims, 10 Drawing Sheets

(51) Int. Cl.
*H04N 21/8547* (2011.01)
*G09B 19/00* (2006.01)

(56) References Cited

U.S. PATENT DOCUMENTS

| | | | |
|---|---|---|---|
| 2009/0320037 A1* | 12/2009 | Gokhale | G06F 9/5016 |
| | | | 718/104 |
| 2012/0069028 A1* | 3/2012 | Bouguerra | H04L 51/10 |
| | | | 345/473 |
| 2012/0206603 A1 | 8/2012 | Rekimto et al. | |
| 2013/0337421 A1 | 12/2013 | Gerken, III | |
| 2014/0074945 A1* | 3/2014 | Kanevsky | A61B 5/165 |
| | | | 709/206 |
| 2014/0118225 A1 | 5/2014 | Jerauld | |

FOREIGN PATENT DOCUMENTS

| | | |
|---|---|---|
| WO | WO-2007098560 A1 | 9/2007 |
| WO | WO-2013027893 A1 | 2/2013 |

OTHER PUBLICATIONS

Wu, Zhan, et al., "Thermal Face Recognition Using Convolutional Neural Network", 2016 International Conference on Optoelectronics and Image Processing School of Electronic and Information Engineering Southwest University Chongqing Key Laboratory of Nonlinear Circuits and Intelligent Information Processing, (2016), 4 pgs.

\* cited by examiner

ANGER

DISGUST

FEAR

HAPPINESS

SADNESS

SURPRISE

AUGMENTED EMOTION DISPLAY FOR AUSTISTIC PERSONS

TECHNICAL FIELD

Embodiments described herein generally relate to visual augmentation systems and in particular to implementing an augmented emotion display.

BACKGROUND

Autism spectrum disorder (ASD) is a general term for a group of complex disorders of brain development. These disorders are characterized, in varying degrees, by difficulties in social interaction, verbal and nonverbal communication, and repetitive behaviors. According to the statistics by United States Center of Disease Control (CDC), about one percent of the world population has autism spectrum disorder. More than 3.5 million Americans live with ASD. Children with ASD often find it hard to recognize and control emotions. Children with ASD may have trouble understanding other people's emotions because of the way they scan faces. People with ASD tend to scan faces in a more random way than typically developed people. They spend less time looking at the eyes and more time focusing on the mouth. This means the information they get from a person's face tells them less about what that person is feeling. What is needed are tools that provide hints on emotion during the interaction to help people with ASD.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

When people with ASD watch television, movies, or other video content, it may be difficult for them to understand the emotions of the actors or characters in the video content. With advances in emotional recognition systems, such systems may be used to assist a person with ASD to identify emotions as they occur in the video. Disclosed herein are systems and methods that augment emotional displays to assist people in recognizing the expressed emotion. In general, an emotional recognition system (ERS) is used to identify an emotion being displayed or emoted by a person in a video. The ERS may analyze portions of the video, speech, or other parts of an audiovisual presentation to determine an emotion. The ERS may then communicate with a display device to present some indication of the emotion. The ERS may be embedded in a video content playback machine, such as a set-top box or a video streaming device (e.g., ROKU® STREAMING STICK®), provided as a cloud-based service, or implemented in other ways. The display device may be a head-mounted display (HMD), smartglasses, a television, a computer monitor, a projection system, or other display device.

In recent years, significant progress has been made in emotion recognition using artificial intelligence techniques. Major breakthroughs have been made using a convolutional neural network (CNN) to recognize basic human emotions from video sequences and speech signals in real-time. Emotion Markup Language (EmotionML) has also been developed to provide a common way for the expression of emotions.

For example, using a CNN in a state of the art embedded vision processor, the basic facial and vocal emotions (happiness, surprise, sadness, anger, fear, and disgust), are recognized from the video sequences and speech signals. These emotions are expressed in a series of EmotionML sentences and transmitted to a pair of glasses through a Bluetooth Low Energy (BLE) channel, where emotion icons and optionally, corresponding texts are displayed with the augmented retinal projection, synchronized with the audio and video sequences on the television monitor. With the augmented emotion display, children with ASD may improve their abilities to recognize the basic emotions from the facial and vocal contexts. This may also keep them more engaged in the conversations. Additional aspects and alternative embodiments are described in further detail in FIGS. 1-12.

Figure 1:
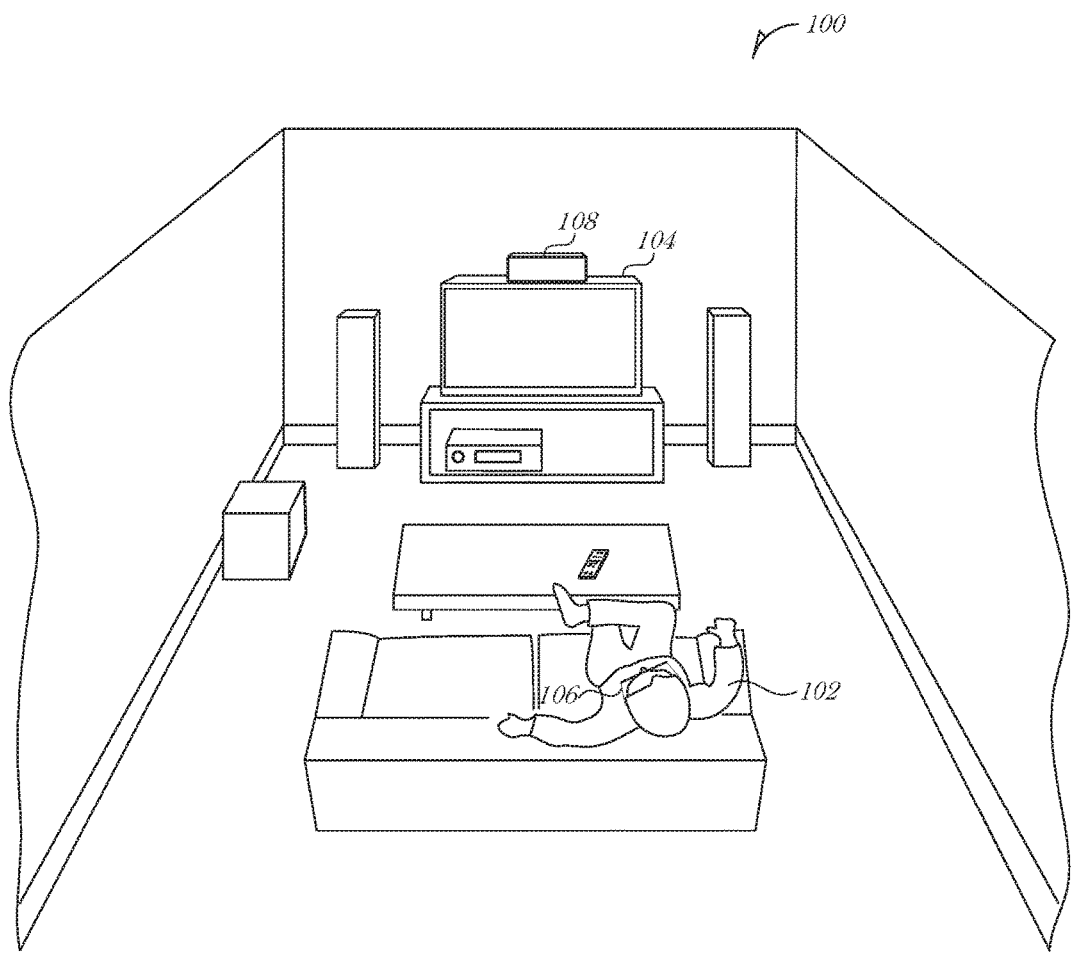
FIG. 1 is a schematic diagram illustrating an operating environment, according to an embodiment.

FIG. 1 is a schematic diagram illustrating an operating environment 100, according to an embodiment. A user 102 is able to view a presentation on a display device 104 in the operating environment 100. In the example illustrated in FIG. 1, the display device 104 is a television monitor. It is understood that the display device 104 may be of any form, including but not limited to a computer monitor, a television, an in-dash vehicle infotainment screen, a projection display, a smartphone, or the like. Additionally, the display device 104 may be incorporated into a wearable device, such as smartglasses, virtual reality goggles, or other head-mounted displays.

The user 102 wears a head-mounted display (HMD) 106, which may be in the form of goggles, glasses, a visor, or other suitable configuration to allow the user 102 to view the presentation on the display device 104 substantially concurrently with augmented content that is presented on the HMD 106. As the user 102 watches the presentation on the display device 104, the presentation is augmented with one or more symbols, icons, letters, words, colors, or other visual embellishments presented in the HMD 106 to assist the user 102 in understanding the presentation. In particular, the embellishments may be used to assist the user 102 in understanding one or more emotions of one or more people in the presentation. For example, the presentation may be a movie containing a scene with an actor who is expressing an emotion. An icon may be presented in the HMD 106 with a sad face indicating that the actor is expressing sadness.

The HMD 106 may be connected (e.g., wired or wirelessly) to a presentation system 108. The presentation system 108 may be a set-top box, video streaming device, media player (e.g., Blu-ray player), or the like. In general, the presentation system 108 include various mechanical, electromechanical, and electrical components to receive or obtain a data stream of audiovisual data from a source (e.g., a network broadcast station); decode, decrypt, decompress, or assemble the data stream; and transmit the data stream to the display device 104 and the HMD 106. The presentation system 108 may be incorporated into the display device 104 (e.g., as a smart television, or as in the case of a laptop computer or tablet device).

The presentation system 108 may augment the data stream sent to the HMD 106 with embellishments. Alternatively, the HMD 106 may receive substantially the same data stream that the display device 104 receives and augment it within the HMD 106 for presentation to the user 102.

As mentioned previously, the HMD 106 and display device 104 may be incorporated into the same device, such that only one presentation is used and the embellishments are presented in-frame on the one presentation. The presentation may be displayed in the HMD 106. For example, using a mini-display, the user 102 may be presented with a displayed image or video that approximates a larger display. The displayed image or video may be augmented with the embellishments in-frame. As another example, the user 102 may not use the HMD 106 and instead watch the presentation on the display device 104, which may include the embellishments in-frame. In this configuration, any viewer of the display device 104 is presented with the embellishments, which may be less preferable than the personalized configuration where the user 102 implements an HMD 106 to augment their own viewing experience.

In configurations where the user 102 wears an HMD 106 to view the augmented presentation, the communications between presentation system 108 and the HMD 106 may be wired or wireless. For example, the HMD 106 may be paired using Bluetooth, or another suitable wireless protocol, with the presentation system 108. The presentation system 108 may use a lightweight messaging protocol to transmit metadata that indicates which emotions are being expressed by which people in the presentation. This metadata may be transmitted using Emotion Markup Language (EmotionML) 1.0, as expressed in the W3C Recommendation of May 22, 2014. EmotionML is a standard to express emotion annotations in media. Emotions are categorized and identified in one or more tags in a tag structure.

The presentation system 108 analyzes one or more video frames and determines an emotion being expressed. For instance, a face in a video frame may be reduced to landmark points including points on an eyebrow (e.g., middle of brow), an eye (e.g., outer edge of eye), a nose (e.g., tip of nose), and a mouth (e.g., outside edges of mouth). Although only a few landmark points are discussed here, it is understood that many more may be present and used by facial analysis programs to determine landmark positions. Examples of additional landmarks include, but are not limited to an outer edge of brow, middle of brow, inner edge of brow, outside edge of eye, midpoints on eye, inside edge of eye, bridge of nose, lateral sides of nose, tip of nose, outside edges of mouth, left and right medial points on upper lip, center of upper lip, left and right medial points on lower lip.

Based on the position of the landmarks or the position over time of the landmarks, an expression or emotion may be determined. For example, a sequence of facial expressions may be recognized and detected as a specific movement pattern of the landmark. An emotion classifier may be trained to recognize the emotions of anger, disgust, fear, happiness, sadness, and surprise as set forth in the Facial Action Coding System (FACS), and the additional sub-divisions of "happiness" into the smile-related categories of joy, skepticism (a/k/a false smile), micro-smile, true smile, and social smile. Based on the emotional classification, an embellishment may be selected from a database of embellishments. The selected embellishment is chosen as one that has an expression that represents that of the emotional classification.

Figure 2:
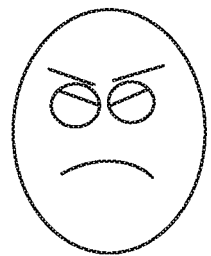
FIG. 2 is a diagram illustrating expressive embellishments that correspond to the six standard emotions.
Figure 2:
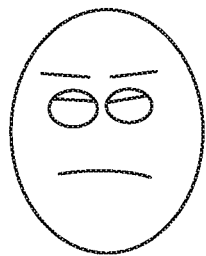
Figure 2:
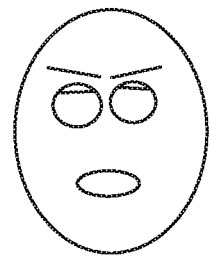
Figure 2:
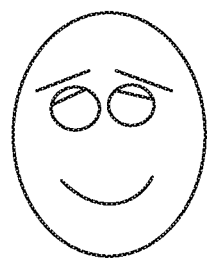
Figure 2:
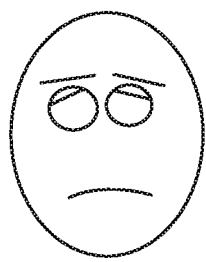
Figure 2:
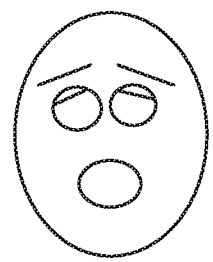

FIG. 2 is a diagram illustrating expressive embellishments that correspond to the six standard emotions. It is understood that additional expressive embellishments may be designed to represent additional emotions, such as the happiness sub-divisions. Other expressive embellishments may be used to convey the emotional states of confusion, shame, exhaustion, neutral, annoyed, bored, etc.

Additionally, embellishments may be in the form of icons, graphics, words, text, symbols, or other visual forms. Combinations of embellishments may be used. The user 102 may configure user preferences to control the type, placement, number, language, and other aspects of the embellishments being displayed.

Figure 3:
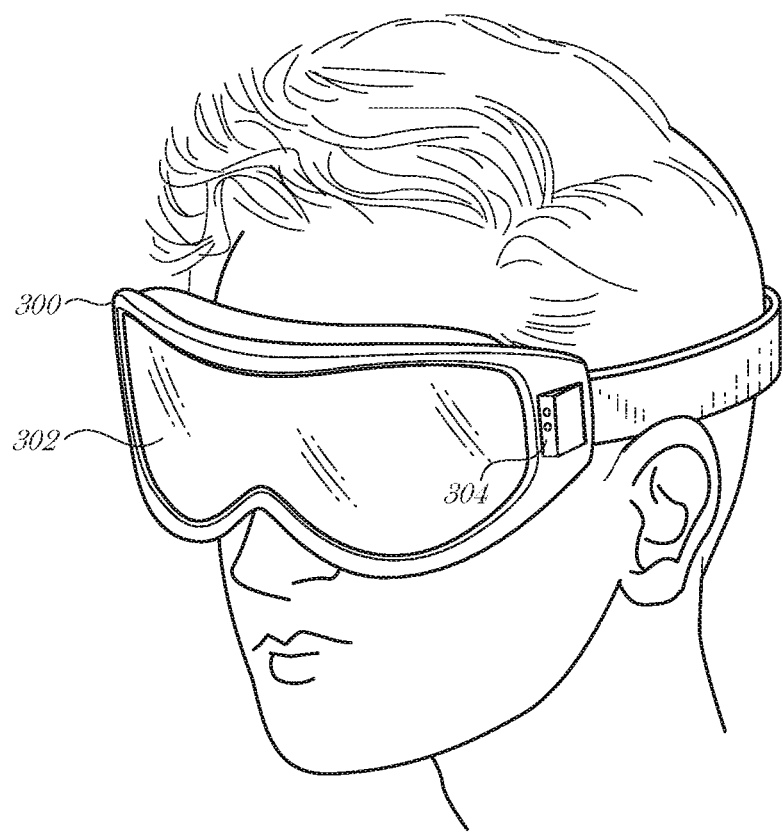
FIG. 3 is a head-mounted display (HMD), according to an embodiment.

FIG. 3 is an HMD 300, according to an embodiment. The HMD 300 includes a see-through display surface 302, a camera array 304, and processing circuitry (not shown). An image or multiple images may be projected onto the display surface 302, such as is done by a microdisplay. Alternatively, some or all of the display surface 302 may be an active display (e.g., an organic light-emitting diode (OLED)) able to produce an image in front of the user. The display also may be provided using retinal projection of various types of light, using a range of mechanisms, including (but not limited to) waveguides, scanning raster, color-separation and other mechanisms.

The camera array 304 may include one or more cameras able to capture visible light, infrared, or the like, and may be used as 2D or 3D cameras (e.g., depth camera). The camera array 304 may be configured to identify a visual presentation that the user 102 is observing (e.g., a television monitor) and people within the visual presentation. The HMD 300 may then use the position of the visual presentation to maintain a relative spatial position of a person in the visual presentation with embellishments presented on the display surface 302.

The HMD 300 may optionally include one or more inward facing sensors (not shown) to sense the user's face, skin, or eyes, and determine a relative motion between the HMD 300 and the detected face, skin, or eyes. The inward facing sensors may be mounted to an interior portion of the HMD 106, such as in the goggles housing, on the lens, or on a projecting portion of the HMD 106, in various embodiments. Using eye tracking mechanism, the HMD 106 may determine which person the user 102 is looking at in a visual presentation and provide corresponding embellishments for the person.

Figure 4:
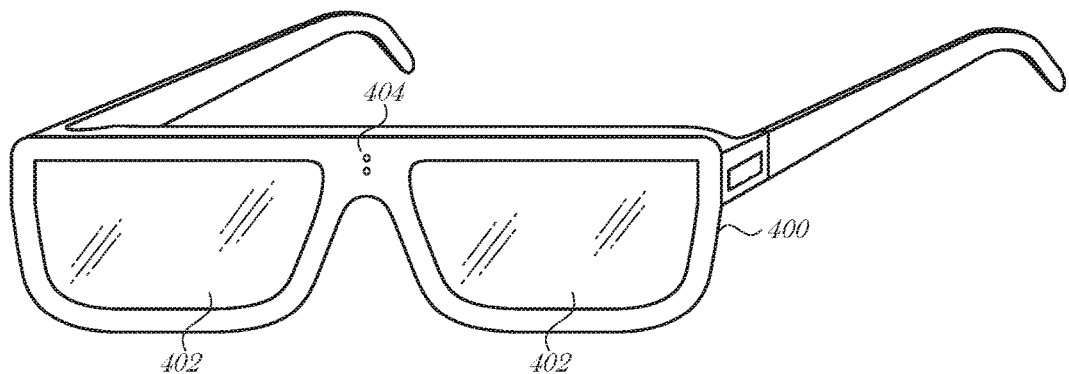
FIG. 4 is another HMD, according to embodiment.

FIG. 4 is another HMD 400, according to embodiment. The HMD 400 in FIG. 4 is in the form of eyeglasses. Similar to the HMD 300 of FIG. 3, HMD 400 includes two display surfaces 402 and a camera array 404. Processing circuitry (not shown) may perform the display functions described herein.

Figure 5:
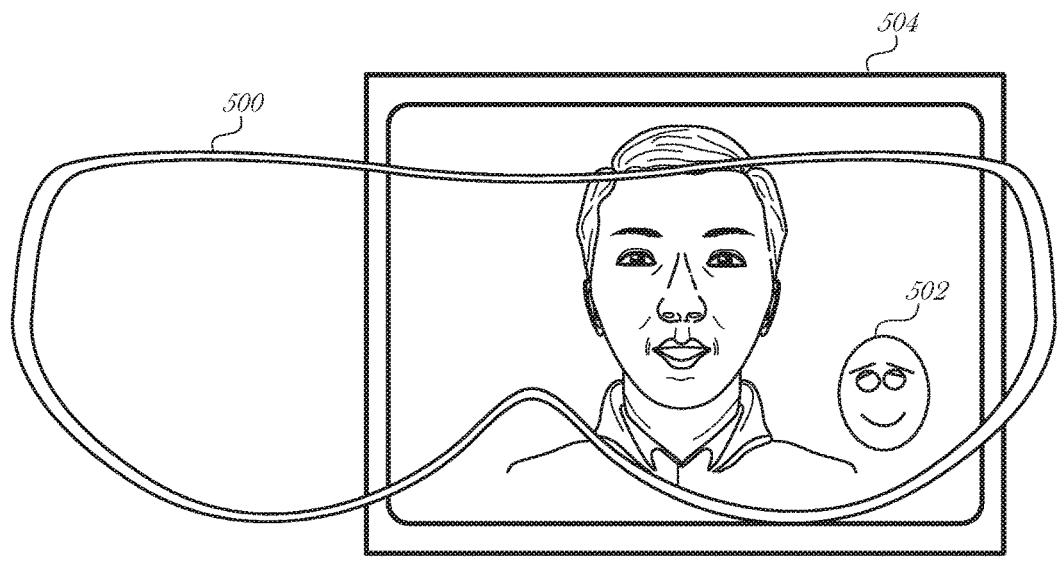
FIGS. 5 and 6 illustrate augmented reality (AR) enhancements, according to embodiments.
Figure 6:
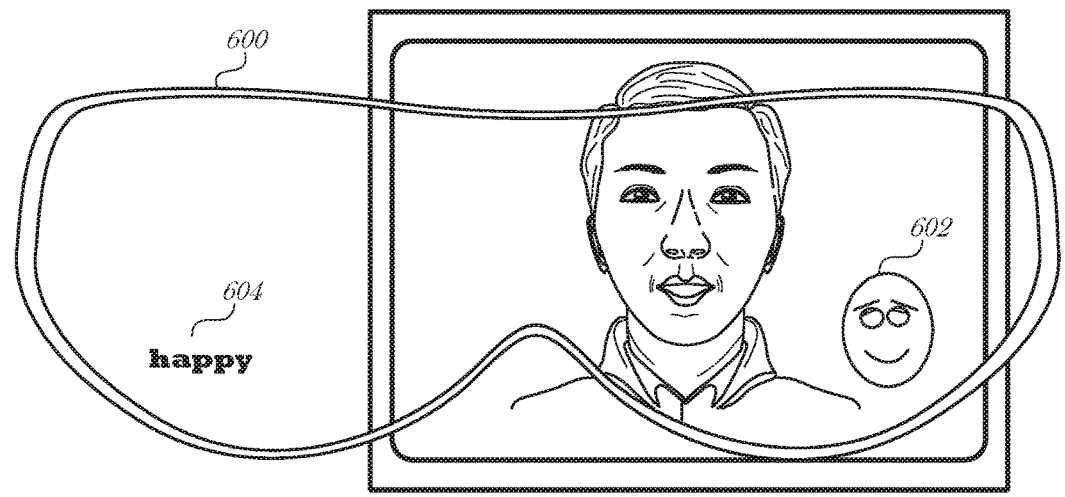

FIGS. 5 and 6 illustrate augmented reality (AR) enhancements, according to embodiments. In FIG. 5, the HMD 500 may receive messaging from a presentation system (e.g., presentation system 108) indicating an emotion being expressed by a person in video content. For instance, the HMD 500 may receive a message indicating that an actor is expressing an emotion of happiness. In response, embellishment 502 is displayed in the HMD 500 to augment the real world presentation on a display device 504 (e.g., display device 104). In FIG. 6, the HMD 600 may receive a similar message indicating that the actor is expressing happiness. The HMD 600 may present multiple embellishments 602 and 604 to provide information to the user.

The embellishments 502, 602, 604, may be dynamically repositioned as the user moves her head to maintain a relative position with the person in the visual presentation. Multiple embellishments may be used to illustrate the emotions of several actors on the screen, for example. In this case, the placement of the embellishments may be used to indicate the emotional display of particular people. As an actor moves in the screen, or as the user moves her head, the embellishment associated with that actor may be moved to correspond with the position of the actor in the screen.

Figure 7:
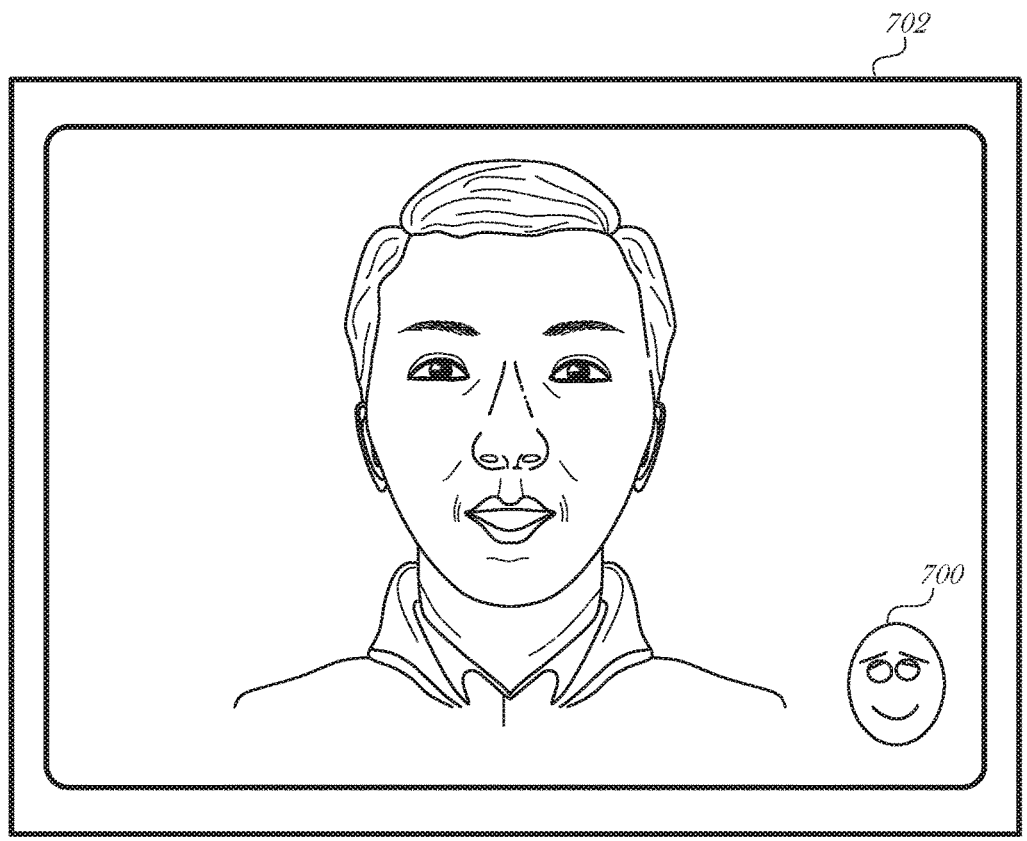
FIG. 7 illustrates another mechanism for presenting enhancements, according to an embodiment.

FIG. 7 illustrates another mechanism for presenting enhancements, according to an embodiment. While the embellishments were presented in an AR display in FIGS. 5 and 6, in FIG. 7, the embellishments are presented in-frame with the video content. As such, embellishment 700 may be presented on a display device 702 (e.g., display device 104). The embellishment 700 may be moved in the frame to track the position of the person associated with the embellishment 700. This may be useful when there are several people in frame, so that the user is able to identify the emotions displayed by each of the people. The presentation illustrated in FIG. 7 may be provided on a display device, which may be a television monitor, computer monitor, projection system, a virtual reality goggle, an augmented reality HMD, or the like.

Figure 8:
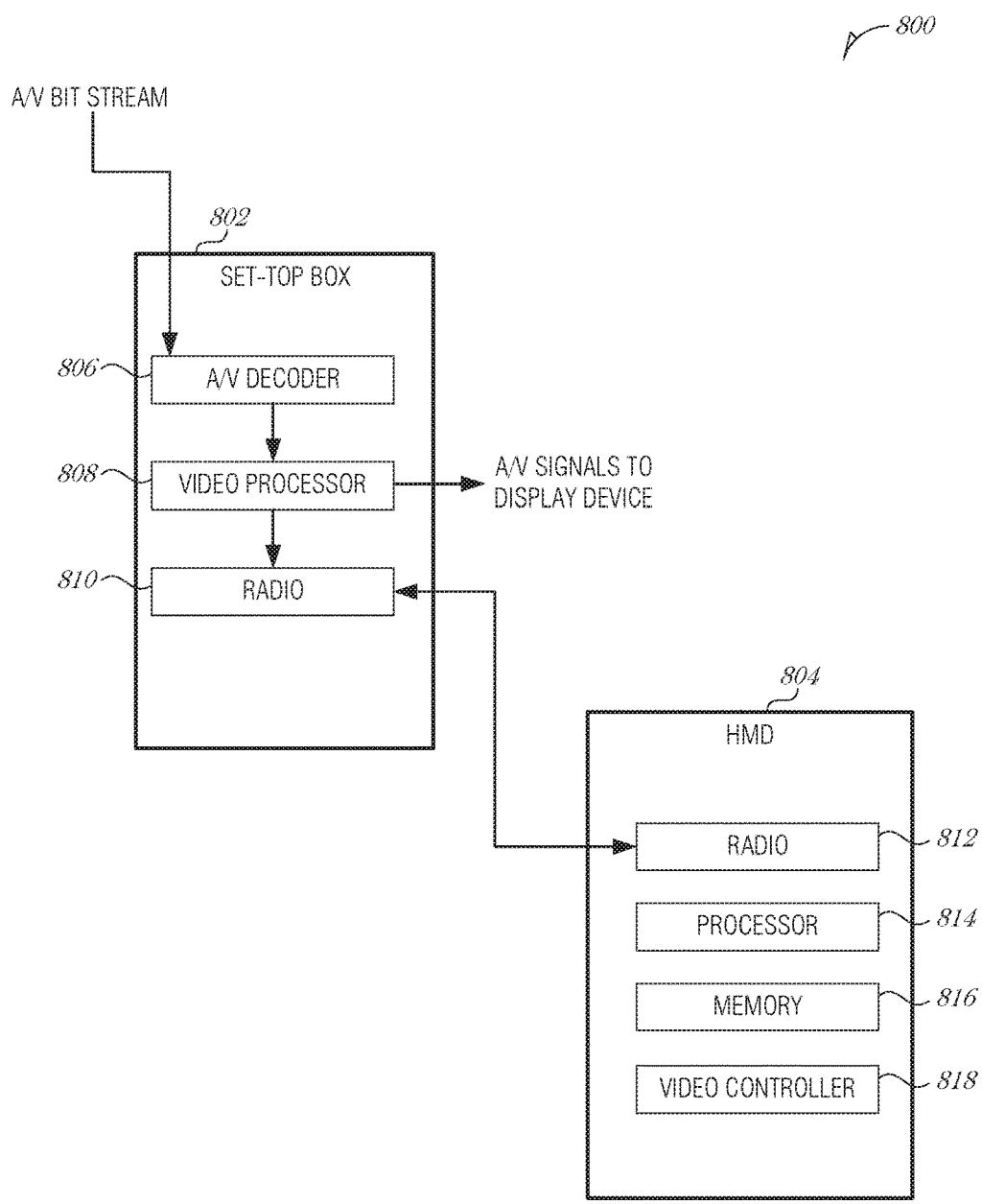
FIG. 8 is a schematic diagram illustrating a presentation system, according to an embodiment.

FIG. 8 is a schematic diagram illustrating a presentation system 800, according to an embodiment. The presentation system 800 includes a set-top box 802 and a head-mounted display (HMD) 804. Portions of the presentation system 800 may be incorporated into a server computer, desktop computer, laptop, wearable device, hybrid device, or other compute device capable of receiving and processing audiovisual data.

The set-top box 802 includes an audio/video decoder 806 that is constructed, programmed, or otherwise configured to receive audiovisual content from a source. The audio/video decoder 806 may receive a data stream from a content provider, such as a cable network provider, and disassemble the data stream into base band audio and video frames. The audio/video decoder 806 provides the decoded (e.g., disassembled) data to an embedded video processor 808. The audio/video decoder 806 may also perform other functions on the incoming data stream, such as decryption, decompression, or other signal processing.

The embedded video processor 808 may include or implement a convolutional neural network (CNN) to analyze the decoded audiovisual content and identify emotions being displayed by people in the audiovisual content. The embedded video processor 808 outputs a signal to a display device. In an example, the display device is a television set. In other examples, the display device may be a computer monitor, an in-dash vehicle infotainment screen, a projection display, or the like. The embedded video processor 808 also outputs data to the HMD 804. In the example illustrated in FIG. 8, the embedded video processor 808 communicates over a wireless network connection (e.g., Bluetooth Low Energy (BLE)) that was established between the set-top box 802 and the HMD 804. As such, the embedded video processor 808 interacts with a radio 810 to transmit and receive data with a corresponding radio 812 in the HMD 804.

The HMD 804 communicates with the set-top box 802 with the radio 812. While the example in FIG. 8 uses a wireless communication link, it is understood that a wired connection may be used instead. The HMD 804 includes a processor 814, memory 816, and a video display controller 818. In some examples, the video display controller 818 is incorporated into the processor 814. For instance, many modern general processors include on-die video processing that provides hardware acceleration, streaming decompression and decryption, video scaling, de-interlacing, color controls, and other video processing features. Using an integrated video display controller avoids the need for a separate graphics card, reducing the package size, power requirements, and manufacturing cost of consumer products.

The memory 816 may store instructions, which when executed by the processor 814, causes a video output to be displayed on a screen or screens of the HMD 104. In an alternate embodiment where retinal projection is used, the video output may be projected onto the user's retinas. The HMD 104 may take various physical forms, such as in the form of a visor, eye glasses, goggles, or the like.

The memory 816 may also store the graphics files, parameters, or other information used to construct or display embellishments via the HMD 804. For instance, bit map or vector based graphics may be stored in memory and accessed based on the message received from the set-top box 802.

In an alternative embodiment, the HMD 804 may obtain the graphics from a remote source, such as a cloud server, a remote database server, or the set-top box 802, and use them for presenting the embellishments. Using a remote storage solution may increase the communication overhead and as such, may be less preferable compared to storing the information locally at the HMD 804.

The memory 816 may also include user preferences to configure parameters. The parameters may alter the presentation of the embellishments. For example, for text-based embellishments, the user's preferred language may be stored so that the emotion indications are presented in an understandable way. Icons features (e.g., size, color, icon selection, etc.), language, text attributes (e.g., font face, font size, etc.), and other aspects of displaying the embellishments may be controlled by the user, by the system administrator, by a healthcare provider for the user, by a parent of the user, or the like.

Communication between the set-top box 802 and HMD 804 may be provided using various mechanisms. In an embodiment, the communication includes messages formatted using the EmotionML protocol. In another embodiment, the communication uses a lightweight messaging protocol and small packets of information, such as a packet with a 3-bit payload that encodes the type of emotion being exhibited. The HMD 804 may then decode the 3-bit payload and present the corresponding embellishment. Multiple applications on the HMD 804 may intercept the messages communicated from the set-top box 802 and act on them according to their respective configurations.

Figure 9:
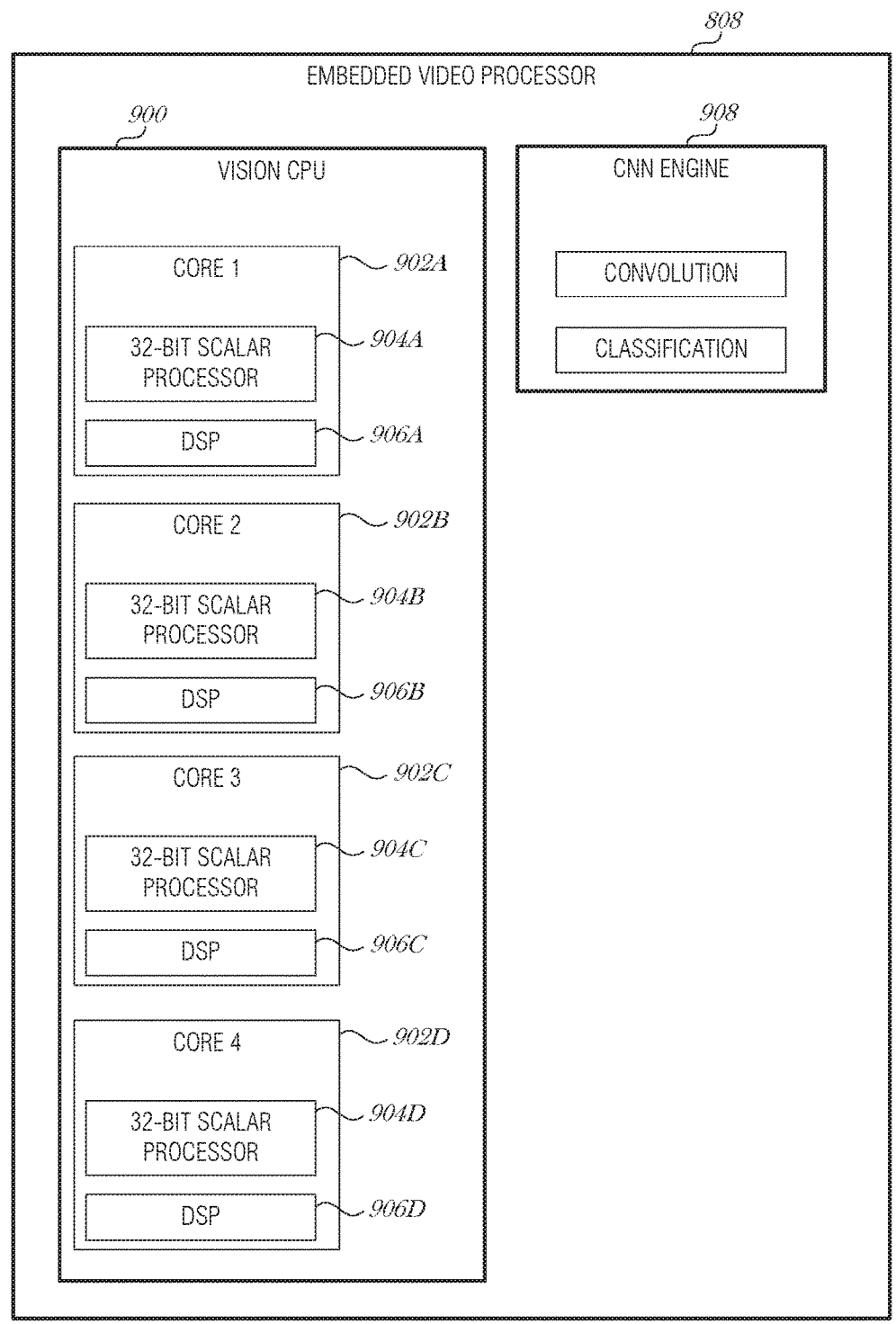
FIG. 9 is a schematic diagram illustrating the embedded video processor of FIG. 8, according to an embodiment.

FIG. 9 is a schematic diagram illustrating the embedded video processor 808 of FIG. 8, according to an embodiment. The embedded video processor 808 may be packaged as a system-on-chip (SoC). The embedded video processor 808 includes a vision central processing unit (CPU) 900. The vision CPU 900 may include one or more cores 902A-D (collectively referred to as 902). Each core 902 includes a respective 32-bit scalar processor 904A-D (collectively referred to as 904) and a respective vector digital signal processor (DSP) 906A-D (collectively referred to as 906). The DSP 906 is typically used for video pre-processing and video post-processing, while the scalar processor 904 is used for audio processing and other house-keeping processes. The DSP 906 may be a 512-bit vector DSP, in an embodiment.

The embedded video processor 808 also includes a convolutional neural network (CNN) engine 908 for image recognition. A CNN is a neural network with a specialized connectivity structure. An image is divided into smaller blocks at each layer in the CNN. Blocks are convolved with the learned filters. The CNN includes multiple stages of feature extractors. The higher stages compute more global, more invariant features, while lower stages include a classification layer. CNNs with similar architectures may be adapted for video and audio recognition. When used for emotion recognition in audio processing. CNN feature extraction may be combined with long short term memory (LSTM), which assesses the importance of temporal context for emotion classification of speech signals.

Figure 10:
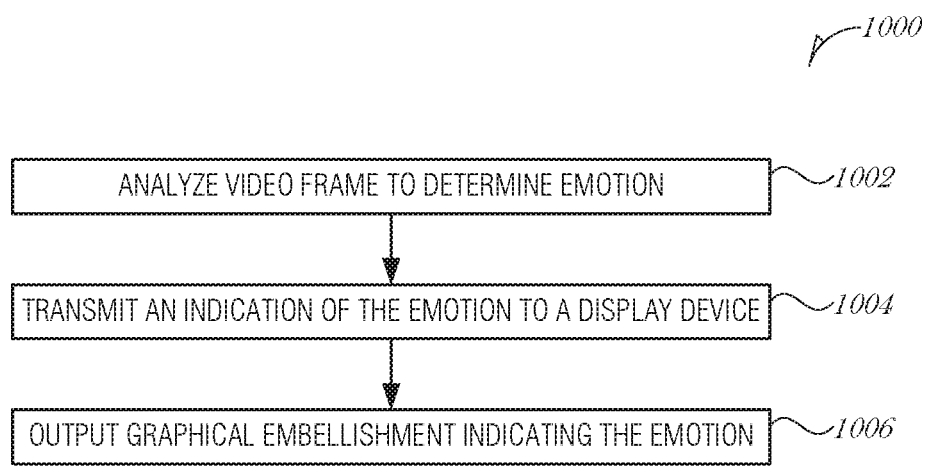
FIG. 10 is a flowchart illustrating data and control flow, according to an embodiment.

FIG. 10 is a flowchart illustrating data and control flow 1000, according to an embodiment. At block 1002, one or more video frames are analyzed to determine an emotion that is being exhibited by a person in the frame. The analysis may be performed using a neural network, such as a CNN. The analysis may analyze video frames and optionally corresponding audio to determine the emotion.

An indication of the emotion is transmitted to a display device (operation 1004), and the display device outputs a graphical embellishment indicating the emotion (operation 1006). The transmission of the indication may be over a wired or wireless connection. The transmission of the indication may be in a standardized messaging format, such as EmotionML. The display device may be an HMD. Alternatively, the display device may be a television, computer monitor, projection system, or other type of display.

Figure 11:
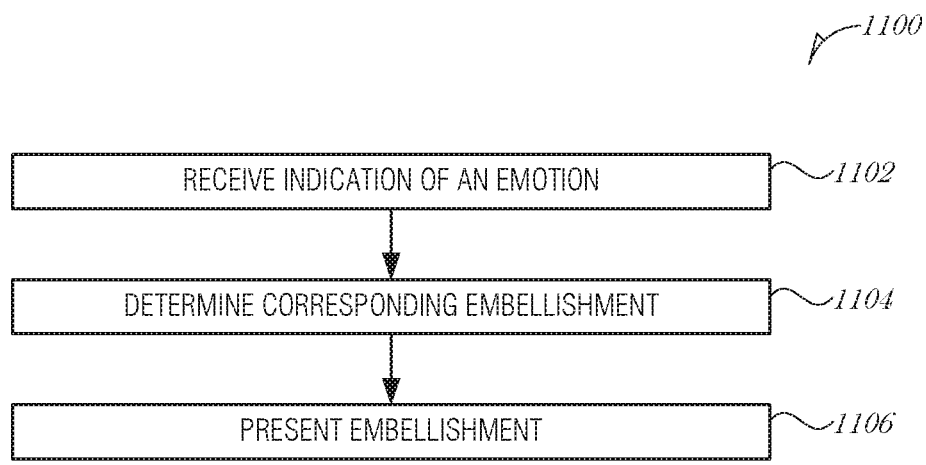
FIG. 11 is a flowchart illustrating a method for displaying emotion embellishments, according to an embodiment.

FIG. 11 is a flowchart illustrating a method 1100 for displaying emotion embellishments, according to an embodiment. At block 1102, an indication of an emotion being exhibited by a person in a video is received at a user device, where the video is presented on a first display device. The user device may be an HMD, laptop computer, desktop computer, television (and associated components such as a set-top box), or the like.

In an embodiment, receiving the indication comprises receiving a standardized message with the indication of the emotion. In a further embodiment, the standardized message is in emotion markup language (EmotionML) format.

At block 1104, an embellishment corresponding to the emotion is determined at the user device.

At block 1106, the embellishment is presented in a location corresponding to the person in the video.

In an embodiment, the standardized message includes a timestamp indicating when the emotion is exhibited in the video. In such an embodiment, presenting the embellishment comprises presenting the embellishment at a time corresponding to the timestamp. This synchronizes the video playback and the display of the emotion embellishment(s).

In an embodiment, the indication of the emotion is in a standardized message, and determining the embellishment comprises parsing the standardized message and accessing a data store to obtain the embellishment. In a further embodiment, the data store is remote from the user device. For instance, the data store may be in a network storage location, such as a remote database server. Optionally, the data store may be partially or fully local to the user device.

In an embodiment, presenting the embellishment comprises displaying the embellishment in a manner that orients the embellishment in an overlay on the first display device. The embellishment may be presented in-frame with video playback (e.g., on the first display device). Optionally, the embellishment may be presented in an augmented reality HMD to provide the overlay of the embellishment over the video being played on a separate device (e.g. the first device, which may be a television). As such, in an embodiment, presenting the embellishment comprises displaying the embellishment on a second display device, the first and second display devices separate and distinct from one another (e.g., the television and the HMD). In an embodiment, the second display device is incorporated in a head-mounted display. In another embodiment, presenting the embellishment comprises projecting the embellishment on a user's retina.

In an embodiment, the method 1100 includes maintaining a relative position of the embellishment and the person in the video. Relative positioning is useful when the person in the video moves in the frame or when the user (e.g., wearer of an HMD) move their perspective or viewing angle to the first display device.

In an embodiment, the method 1100 includes receiving an audiovisual data stream including the video, analyzing the audiovisual data stream to determine the emotion being exhibited by the person in the video, and transmitting the indication of the emotion to the user device. The emotion analysis and detection may be performed in the same device that displays the embellishment (e.g., in the HMD), or at a separate device (e.g., where the analysis is performed at a set-top box and the presentation of the embellishment is performed at the HMD). In an embodiment, analyzing the audiovisual data stream comprises implementing a convolutional neural network to determine the emotion. In an embodiment, analyzing the audiovisual data stream comprises analyzing video and audio in the audiovisual data stream to determine the emotion. In a further embodiment, analyzing the video and audio is performed using convolutional neural networks.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instructions on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 12:
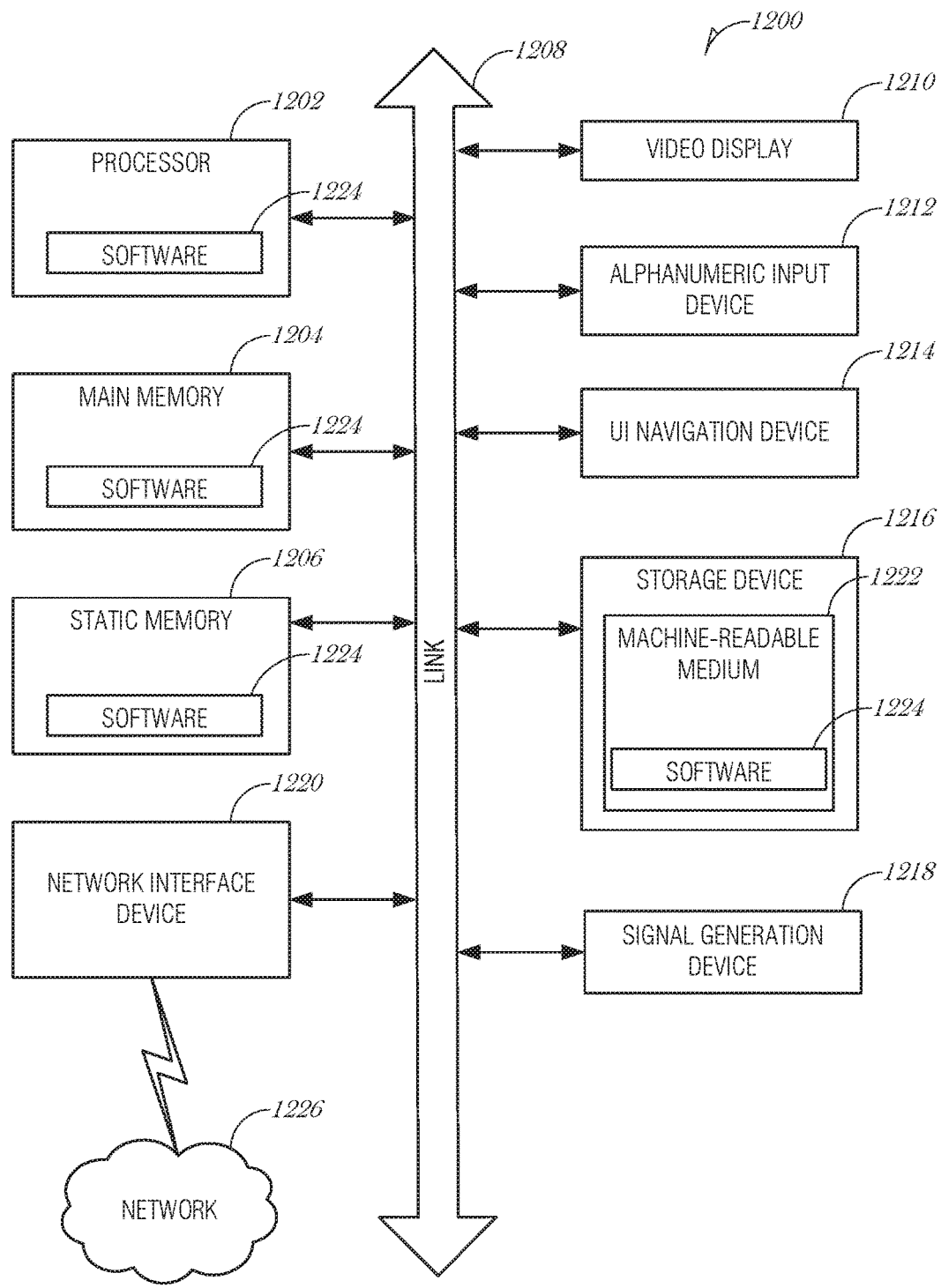
FIG. 12 is a block diagram illustrating an example machine upon which any one or more of the techniques (e.g., methodologies) discussed herein may perform, according to an example embodiment.

FIG. 12 is a block diagram illustrating a machine in the example form of a computer system 1200, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, set-top box, streaming device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via a link 1208 (e.g., bus). The computer system 1200 may further include a video display unit 1210, an alphanumeric input device 1212 (e.g., a keyboard), and a user interface (UI) navigation device 1214 (e.g., a mouse). In one embodiment, the video display unit 1210, input device 1212 and UI navigation device 1214 are incorporated into a touch screen display. The computer system 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, gyrometer, magnetometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media.

While the machine-readable medium 1222 is illustrated in an example embodiment to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Network interface device 1220 may be configured or programmed to implement the methodologies described herein. In particular, the network interface device 1220 may provide various aspects of packet inspection, aggregation, queuing, and processing. The network interface device 1220 may also be configured or programmed to communicate with a memory management unit (MMU), processor 1202, main memory 1204, static memory 1206, or other components of the system 1200 over the link 1208. The network interface device 1220 may query or otherwise interface with various components of the system 1200 to inspect cache memory; trigger or cease operations of a virtual machine, process, or other processing element; or otherwise interact with various computing units or processing elements that are in the system 1200 or external from the system 1200.

Additional Notes & Examples

Example 1 is a system for displaying emotion embellishments, the system comprising: a first display device; a processor subsystem; and memory including instructions, which when executed by the processor subsystem cause the processor subsystem to: receive an indication of an emotion being exhibited by a person in a video, the video presented on a first display device; determine an embellishment corresponding to the emotion; and present the embellishment in a location corresponding to the person in the video.

In Example 2, the subject matter of Example 1 optionally includes wherein to receive the indication, the processor subsystem is to receive a standardized message with the indication of the emotion.

In Example 3, the subject matter of Example 2 optionally includes wherein the standardized message is in emotion markup language (EmotionML) format.

In Example 4, the subject matter of any one or more of Examples 2-3 optionally include wherein the standardized message includes a timestamp indicating when the emotion is exhibited in the video, and wherein to present the embellishment, the processor subsystem is to present the embellishment at a time corresponding to the timestamp.

In Example 5, the subject matter of any one or more of Examples 1-4 optionally include wherein the indication of the emotion is in a standardized message, and wherein to determine the embellishment, the processor subsystem is to: parse the standardized message; and access a data store to obtain the embellishment.

In Example 6, the subject matter of Example 5 optionally includes wherein the data store is remote from the user device.

In Example 7, the subject matter of any one or more of Examples 1-6 optionally include wherein to present the embellishment, the processor subsystem is to display the embellishment in a manner that orients the embellishment in an overlay on the first display device.

In Example 8, the subject matter of any one or more of Examples 1-7 optionally include wherein to present the embellishment, the processor subsystem is to display the embellishment on a second display device, the first and second display devices separate and distinct from one another.

In Example 9, the subject matter of Example 8 optionally includes wherein the second display device is incorporated in a head-mounted display.

In Example 10, the subject matter of any one or more of Examples 7-9 optionally include wherein to present the embellishment, the processor subsystem is to project the embellishment on a user's retina.

In Example 11, the subject matter of any one or more of Examples 1-10 optionally include wherein the processor subsystem is to maintain a relative position of the embellishment and the person in the video.

In Example 12, the subject matter of any one or more of Examples 1-11 optionally include wherein the processor subsystem is to: receive an audiovisual data stream including the video; analyze the audiovisual data stream to determine the emotion being exhibited by the person in the video; and transmit the indication of the emotion to the user device.

In Example 13, the subject matter of Example 12 optionally includes wherein to analyze the audiovisual data stream, the processor subsystem is to implement a convolutional neural network to determine the emotion.

In Example 14, the subject matter of any one or more of Examples 12-13 optionally include wherein to analyze the audiovisual data stream, the processor subsystem is to analyze video and audio in the audiovisual data stream to determine the emotion.

In Example 15, the subject matter of Example 14 optionally includes wherein the video and audio analysis is performed using convolutional neural networks.

Example 16 is a method of displaying emotion embellishments, the method comprising: receiving, at a user device, an indication of an emotion being exhibited by a person in a video, the video presented on a first display device; determining, at the user device, an embellishment corresponding to the emotion; and presenting the embellishment in a location corresponding to the person in the video.

In Example 17, the subject matter of Example 16 optionally includes wherein receiving the indication comprises receiving a standardized message with the indication of the emotion.

In Example 18, the subject matter of Example 17 optionally includes wherein the standardized message is in emotion markup language (EmotionML) format.

In Example 19, the subject matter of any one or more of Examples 17-18 optionally include wherein the standardized message includes a timestamp indicating when the emotion is exhibited in the video, and wherein presenting the embellishment comprises presenting the embellishment at a time corresponding to the timestamp.

In Example 20, the subject matter of any one or more of Examples 16-19 optionally include wherein the indication of the emotion is in a standardized message, and wherein determining the embellishment comprises: parsing the standardized message; and accessing a data store to obtain the embellishment.

In Example 21, the subject matter of Example 20 optionally includes wherein the data store is remote from the user device.

In Example 22, the subject matter of any one or more of Examples 16-21 optionally include wherein presenting the embellishment comprises displaying the embellishment in a manner that orients the embellishment in an overlay on the first display device.

In Example 23, the subject matter of any one or more of Examples 16-22 optionally include wherein presenting the embellishment comprises displaying the embellishment on a second display device, the first and second display devices separate and distinct from one another.

In Example 24, the subject matter of Example 23 optionally includes wherein the second display device is incorporated in a head-mounted display.

In Example 25, the subject matter of any one or more of Examples 22-24 optionally include wherein presenting the embellishment comprises projecting the embellishment on a user's retina.

In Example 26, the subject matter of any one or more of Examples 16-25 optionally include maintaining a relative position of the embellishment and the person in the video.

In Example 27, the subject matter of any one or more of Examples 16-26 optionally include receiving an audiovisual data stream including the video; analyzing the audiovisual data stream to determine the emotion being exhibited by the person in the video; and transmitting the indication of the emotion to the user device.

In Example 28, the subject matter of Example 27 optionally includes wherein analyzing the audiovisual data stream comprises implementing a convolutional neural network to determine the emotion.

In Example 29, the subject matter of any one or more of Examples 27-28 optionally include wherein analyzing the audiovisual data stream comprises analyzing video and audio in the audiovisual data stream to determine the emotion.

In Example 30, the subject matter of Example 29 optionally includes wherein the video and audio analysis is performed using convolutional neural networks.

Example 31 is at least one machine-readable medium including instructions, which when executed by a machine, cause the machine to perform operations of any of the methods of Examples 16-30.

Example 32 is an apparatus comprising means for performing any of the methods of Examples 16-30.

Example 33 is an apparatus for displaying emotion embellishments, the apparatus comprising: means for receiving, at a user device, an indication of an emotion being exhibited by a person in a video, the video presented on a first display device; means for determining, at the user device, an embellishment corresponding to the emotion; and means for presenting the embellishment in a location corresponding to the person in the video.

In Example 34, the subject matter of Example 33 optionally includes wherein the means for receiving the indication comprises means for receiving a standardized message with the indication of the emotion.

In Example 35, the subject matter of Example 34 optionally includes wherein the standardized message is in emotion markup language (EmotionML) format.

In Example 36, the subject matter of any one or more of Examples 34-35 optionally include wherein the standardized message includes a timestamp indicating when the emotion is exhibited in the video, and wherein the means for presenting the embellishment comprises means for presenting the embellishment at a time corresponding to the timestamp.

In Example 37, the subject matter of any one or more of Examples 33-36 optionally include wherein the indication of the emotion is in a standardized message, and wherein the means for determining the embellishment comprises: means for parsing the standardized message; and means for accessing a data store to obtain the embellishment.

In Example 38, the subject matter of Example 37 optionally includes wherein the data store is remote from the user device.

In Example 39, the subject matter of any one or more of Examples 33-38 optionally include wherein the means for presenting the embellishment comprises means for displaying the embellishment in a manner that orients the embellishment in an overlay on the first display device.

In Example 40, the subject matter of any one or more of Examples 33-39 optionally include wherein the means for presenting the embellishment comprises means for displaying the embellishment on a second display device, the first and second display devices separate and distinct from one another.

In Example 41, the subject matter of Example 40 optionally includes wherein the second display device is incorporated in a head-mounted display.

In Example 42, the subject matter of any one or more of Examples 39-41 optionally include wherein the means for presenting the embellishment comprises means for projecting the embellishment on a user's retina.

In Example 43, the subject matter of any one or more of Examples 33-42 optionally include means for maintaining a relative position of the embellishment and the person in the video.

In Example 44, the subject matter of any one or more of Examples 33-43 optionally include means for receiving an audiovisual data stream including the video; means for analyzing the audiovisual data stream to determine the emotion being exhibited by the person in the video; and means for transmitting the indication of the emotion to the user device.

In Example 45, the subject matter of Example 44 optionally includes wherein the means for analyzing the audiovisual data stream comprises means for implementing a convolutional neural network to determine the emotion.

In Example 46, the subject matter of any one or more of Examples 44-45 optionally include wherein the means for analyzing the audiovisual data stream comprises means for analyzing video and audio in the audiovisual data stream to determine the emotion.

In Example 47, the subject matter of Example 46 optionally includes wherein the video and audio analysis is performed using convolutional neural networks.

Example 48 is at least one machine-readable medium including instructions for displaying emotion embellishments, which when executed by a machine, cause the machine to: receive, at a user device, an indication of an emotion being exhibited by a person in a video, the video presented on a first display device, determine, at the user device, an embellishment corresponding to the emotion; and present the embellishment in a location corresponding to the person in the video.

In Example 49, the subject matter of Example 48 optionally includes wherein the instructions to receive the indication comprise instructions to receive a standardized message with the indication of the emotion.

In Example 50, the subject matter of Example 49 optionally includes wherein the standardized message is in emotion markup language (EmotionML) format.

In Example 51, the subject matter of any one or more of Examples 49-50 optionally include wherein the standardized message includes a timestamp indicating when the emotion is exhibited in the video, and wherein the instructions to present the embellishment comprise instructions to present the embellishment at a time corresponding to the timestamp.

In Example 52, the subject matter of any one or more of Examples 48-51 optionally include wherein the indication of the emotion is in a standardized message, and wherein the instructions to determine the embellishment comprise instructions to: parse the standardized message; and access a data store to obtain the embellishment.

In Example 53, the subject matter of Example 52 optionally includes wherein the data store is remote from the user device.

In Example 54, the subject matter of any one or more of Examples 48-53 optionally include wherein the instructions to present the embellishment comprise instructions to display the embellishment in a manner that orients the embellishment in an overlay on the first display device.

In Example 55, the subject matter of any one or more of Examples 48-54 optionally include wherein the instructions to present the embellishment comprise instructions to display the embellishment on a second display device, the first and second display devices separate and distinct from one another.

In Example 56, the subject matter of Example 55 optionally includes wherein the second display device is incorporated in a head-mounted display.

In Example 57, the subject matter of any one or more of Examples 54-56 optionally include wherein the instructions to present the embellishment comprise instructions to project the embellishment on a user's retina.

In Example 58, the subject matter of any one or more of Examples 48-57 optionally include instructions to maintain a relative position of the embellishment and the person in the video.

In Example 59, the subject matter of any one or more of Examples 48-58 optionally include instructions to: receive an audiovisual data stream including the video; analyze the audiovisual data stream to determine the emotion being exhibited by the person in the video; and transmit the indication of the emotion to the user device.

In Example 60, the subject matter of Example 59 optionally includes wherein the instructions to analyze the audiovisual data stream comprise instructions to implement a convolutional neural network to determine the emotion.

In Example 61, the subject matter of any one or more of Examples 59-60 optionally include wherein the instructions to analyze the audiovisual data stream comprise instructions to analyze video and audio in the audiovisual data stream to determine the emotion.

In Example 62, the subject matter of Example 61 optionally includes wherein the video and audio analysis is performed using convolutional neural networks.

Example 63 is at least one machine-readable medium including instructions, which when executed by a machine, cause the machine to perform operations of any of the operations of Examples 1-62.

Example 64 is an apparatus comprising means for performing any of the operations of Examples 1-62.

Example 65 is a system to perform the operations of any of the Examples 1-62.

Example 66 is a method to perform the operations of any of the Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third." etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for displaying emotion embellishments, the system comprising:
   a processor subsystem; and
   memory including instructions, which when executed by the processor subsystem cause the processor subsystem to:
      receive an indication of an emotion being exhibited by a person in a video, the video presented on a first display device;
      determine an embellishment corresponding to the emotion;
      present the embellishment in a location corresponding to the person in the video, wherein, to present the embellishment, the processor subsystem is to display the embellishment on a second display device, wherein the first and second display devices are separate and distinct from one another and the second display device presents the embellishment as an overlay on the video presented on the first display device; and
update the location of the embellishment on the second display device to co-locate the embellishment with the person in the video, in response to determining that the person in the video moved within a field-of-view of a scene presented in the video on the first display device.

2. The system of claim 1, wherein to receive the indication, the processor subsystem is to receive a standardized message with the indication of the emotion.

3. The system of claim 2, wherein the standardized message is in emotion markup language (EmotionML) format.

4. The system of claim 2, wherein the standardized message includes a timestamp indicating when the emotion is exhibited in the video, and wherein to present the embellishment, the processor subsystem is to present the embellishment at a time corresponding to the timestamp.

5. The system of claim 1, wherein the indication of the emotion is in a standardized message, and wherein to determine the embellishment, the processor subsystem is to:
parse the standardized message; and
access a data store to obtain the embellishment.

6. The system of claim 5, wherein the data store is remote from the system.

7. The system of claim 1, wherein to present the embellishment, the processor subsystem is to display the embellishment in a manner that orients the embellishment in an overlay on the first display device.

8. The system of claim 1, wherein the second display device is incorporated in a head-mounted display.

9. The system of claim 1, wherein the processor subsystem is to:
receive an audiovisual data stream including the video;
analyze the audiovisual data stream to determine the emotion being exhibited by the person in the video; and
transmit the indication of the emotion.

10. A method of displaying emotion embellishments, the method comprising:
receiving, at a user device, an indication of an emotion being exhibited by a person in a video, the video presented on a first display device;
determining, at the user device, an embellishment corresponding to the emotion;
presenting the embellishment for display in a location corresponding to the person in the video on a second display device, wherein the first and second display are devices separate and distinct from one another and the second display device presents the embellishment as an overlay on the video presented on the first display device; and
updating the location of the embellishment on the second display device to co-locate the embellishment with the person in the video, in response to determining that the person in the video moved within a field-of-view of a scene presented in the video on the first display device.

11. The method of claim 10, wherein receiving the indication comprises receiving a standardized message with the indication of the emotion.

12. The method of claim 11, wherein the standardized message is in emotion markup language (EmotionML) format.

13. The method of claim 11, wherein the standardized message includes a timestamp indicating when the emotion is exhibited in the video, and wherein presenting the embellishment comprises presenting the embellishment at a time corresponding to the timestamp.

14. The method of claim 10, wherein the indication of the emotion is in a standardized message, and wherein determining the embellishment comprises:
parsing the standardized message; and
accessing a data store to obtain the embellishment.

15. The method of claim 10, further comprising:
receiving an audiovisual data stream including the video;
analyzing the audiovisual data stream to determine the emotion being exhibited by the person in the video; and
transmitting the indication of the emotion to the user device.

16. The method of claim 15, wherein analyzing the audiovisual data stream comprises implementing a convolutional neural network to determine the emotion.

17. The method of claim 15, wherein analyzing the audiovisual data stream comprises analyzing video and audio in the audiovisual data stream to determine the emotion.

18. The method of claim 17, wherein the video and audio analysis is performed using convolutional neural networks.

19. At least one machine-readable medium including instructions for displaying emotion embellishments, which when executed by a machine, cause the machine to:
receive, at a user device, an indication of an emotion being exhibited by a person in a video, the video presented on a first display device;
determine, at the user device, an embellishment corresponding to the emotion;
present the embellishment in a location corresponding to the person in the video on a second display device, wherein the first and second display devices are separate and distinct from one another and the second display device presents the embellishment as an overlay on the video presented on the first display device; and
update the location of the embellishment on the second display device to co-locate the embellishment with the person in the video, in response to determining that the person in the video moved within a field-of-view of a scene presented in the video on the first display device.

20. The machine-readable medium of claim 19, wherein the instructions to receive the indication comprise instructions to receive a standardized message with the indication of the emotion.

21. The machine-readable medium of claim 20, wherein the standardized message is in emotion markup language (EmotionML) format.

22. The machine-readable medium of claim 19, further comprising instructions to:
receive an audiovisual data stream including the video;
analyze the audiovisual data stream to determine the emotion being exhibited by the person in the video; and
transmit the indication of the emotion to the user device.

23. The machine-readable medium of claim 22, wherein the instructions to analyze the audiovisual data stream comprise instructions to implement a convolutional neural network to determine the emotion.

24. The machine-readable medium of claim 22, wherein the instructions to analyze the audiovisual data stream comprise instructions to analyze video and audio in the audiovisual data stream to determine the emotion.

\* \* \* \* \*